United States Patent
Burton et al.

(10) Patent No.: US 10,835,060 B2
(45) Date of Patent: Nov. 17, 2020

(54) PICTURE HANGER COMPRISING EXTRUDED PROFILE

(71) Applicant: Kenneth William Burton, Los Altos, CA (US)

(72) Inventors: Kenneth William Burton, Los Altos, CA (US); Peter H. Muller, Portland, OR (US)

(73) Assignee: Kenneth William Burton, Los Altos, CA (US)

( * ) Notice: Subject to any disclaimer, the term of this patent is extended or adjusted under 35 U.S.C. 154(b) by 76 days.

(21) Appl. No.: 16/216,461

(22) Filed: Dec. 11, 2018

(65) Prior Publication Data
US 2019/0183265 A1 Jun. 20, 2019

Related U.S. Application Data

(60) Provisional application No. 62/607,365, filed on Dec. 19, 2017.

(51) Int. Cl.
*A47G 1/16* (2006.01)
*A47G 1/20* (2006.01)
(Continued)

(52) U.S. Cl.
CPC ............... *A47G 1/164* (2013.01); *A47G 1/16* (2013.01); *A47G 1/1613* (2013.01); *A47G 1/202* (2013.01);
(Continued)

(58) Field of Classification Search
CPC ...... A47G 1/1613; A47G 1/164; A47G 1/202; A47G 1/1606; A47G 1/205; A47G 1/1626;
(Continued)

(56) References Cited

U.S. PATENT DOCUMENTS 1,720,309 A   7/1929   Wakefield
2,641,427 A * 6/1953   Krogh ................. A47G 1/1613
                                                  248/496

(Continued)

FOREIGN PATENT DOCUMENTS

DE        29707690 U1 *  7/1997  ........... A47G 1/1613
DE    102015103599 A1 *  9/2015  ............. F16M 13/02
WO    WO-2017156539 A1 *  9/2017 ............. F16B 2/185

OTHER PUBLICATIONS

How to Hang Level Pictures without a Level, Picture Perfect Hanger®, http://pictureperfecthanger.com/; Hangit, Novi, MI.(2017).

*Primary Examiner* — Hiwot E Tefera
*Assistant Examiner* — Taylor L Morris
(74) *Attorney, Agent, or Firm* — Kilyk & Bowersox, P.L.L.C.

(57) ABSTRACT

An adjustable hanger assembly is provided that includes a slider base and a slider that can be adjusted horizontally and vertically within the slider base. The slider can be held in a position by a fastener such as a threaded fastener. A series of horizontal grooves and ridges on the slider can engage a series of complementary grooves and ridges on the slider base, and the engagement can occur at different heights. The slider can freely move horizontally once inserted into the slider base. The slider base can be squeezed by tightening the threaded fastener to pinch the slider and hold the slider in a desired vertical and horizontal position. The hanger assembly can be adjusted both vertically and horizontally after the slider base is fixedly secured to a wall.

15 Claims, 5 Drawing Sheets

(51) Int. Cl.
  *F16M 13/02* (2006.01)
  *F16M 11/04* (2006.01)
(52) U.S. Cl.
  CPC .......... *A47G 1/1606* (2013.01); *A47G 1/1626* (2013.01); *F16M 11/041* (2013.01); *F16M 13/02* (2013.01); *F16M 13/022* (2013.01)
(58) Field of Classification Search
  CPC . A47G 1/24; A47G 1/16; A47G 1/168; A47B 95/008; F16M 13/02; F16M 13/022; F16M 11/04; F16B 2/005; F16B 2/20; F16B 2/22
  USPC .................................................. 248/476, 477
  See application file for complete search history.

(56) References Cited

U.S. PATENT DOCUMENTS

| | | | | |
|---|---|---|---|---|
| 2,740,603 | A * | 4/1956 | Wofford | A47G 1/1613 248/494 |
| 2,879,018 | A * | 3/1959 | Pence | A47G 1/168 248/494 |
| 3,074,677 | A * | 1/1963 | Eckhardt | F16L 3/1226 248/74.1 |
| 3,669,035 | A * | 6/1972 | Grossman | A47B 96/067 108/152 |
| 3,902,932 | A * | 9/1975 | Gdanski | A47K 10/185 248/313 |
| 3,903,671 | A * | 9/1975 | Cuin | E04F 13/0803 52/480 |
| 4,067,536 | A * | 1/1978 | McBeth | A47G 1/215 248/316.1 |
| 4,238,103 | A * | 12/1980 | Kurtz | F16M 13/02 248/488 |
| 4,436,269 | A * | 3/1984 | Dirksing | E03D 9/032 248/214 |
| 4,557,455 | A | 12/1985 | Benjamin | |
| 4,661,030 | A | 4/1987 | Delmastro | |
| 4,694,965 | A | 9/1987 | Parnell | |
| D340,403 | S * | 10/1993 | Bruner, Jr. | D8/355 |
| 5,360,121 | A | 11/1994 | Sothman | |
| 5,584,462 | A * | 12/1996 | Reese | A47G 1/202 248/339 |
| 5,634,245 | A * | 6/1997 | Rouser | A44B 18/0053 24/452 |
| 5,685,516 | A * | 11/1997 | Simmons | A47G 1/20 248/489 |
| 5,718,493 | A * | 2/1998 | Nikolai | A47B 95/008 312/245 |
| 6,003,825 | A | 12/1999 | Abernathy, Jr. | |
| 6,131,864 | A | 10/2000 | Schumann | |
| 6,299,123 | B1 | 10/2001 | Hayde | |
| 6,470,647 | B2 * | 10/2002 | Hsueh | E04F 13/0807 52/235 |
| 6,557,813 | B1 | 5/2003 | Duggan | |
| 6,663,075 | B2 * | 12/2003 | Zuller | A47G 1/164 248/476 |
| 6,666,425 | B1 | 12/2003 | Ferguson | |
| 6,769,660 | B2 * | 8/2004 | DeLine | A47G 1/1606 248/476 |
| 6,827,320 | B2 | 12/2004 | Yeh | |
| 7,010,928 | B2 * | 3/2006 | Spanger | F24F 13/222 248/229.15 |
| 7,077,372 | B2 * | 7/2006 | Moran | A61B 90/39 248/222.11 |
| 7,201,357 | B2 | 4/2007 | Price et al. | |
| 7,234,671 | B2 | 6/2007 | Avinger | |
| 7,523,908 | B2 * | 4/2009 | Kozak | F16B 45/00 24/115 K |
| 7,578,492 | B2 | 8/2009 | Darre' | |
| 7,677,521 | B2 | 3/2010 | Price | |
| 7,686,273 | B2 * | 3/2010 | Christodoulou | A47G 1/202 248/295.11 |
| 7,913,965 | B2 * | 3/2011 | Boulard | B60J 7/104 248/228.5 |
| 8,011,635 | B2 * | 9/2011 | Aleo | A47G 1/164 248/205.1 |
| 8,356,778 | B2 * | 1/2013 | Birli | F16L 3/20 248/73 |
| 8,371,543 | B2 * | 2/2013 | Schneider | A47G 1/1606 248/224.8 |
| 8,376,308 | B2 | 2/2013 | Greve' | |
| 8,613,411 | B1 * | 12/2013 | Mohns | F16L 3/1226 174/135 |
| 8,746,646 | B2 * | 6/2014 | Fluhrer | H02S 20/20 248/500 |
| 9,370,267 | B2 | 6/2016 | Greve | |
| 9,521,915 | B1 * | 12/2016 | Tanger | A47G 1/1606 |
| 9,609,964 | B1 * | 4/2017 | Munson | A47G 1/1606 |
| 9,642,478 | B1 * | 5/2017 | Tanger | A47G 1/164 |
| 10,400,949 | B1 * | 9/2019 | Kozak | F16M 13/02 |
| 2007/0056921 | A1 * | 3/2007 | Lo | F16M 13/02 211/94.01 |
| 2007/0075211 | A1 | 4/2007 | Potter | |
| 2009/0045310 | A1 * | 2/2009 | Koesema, Jr. | H02G 3/30 248/316.7 |
| 2011/0011994 | A1 * | 1/2011 | Ahlstrom | A47G 1/168 248/205.4 |
| 2011/0268529 | A1 * | 11/2011 | Nakai | F16B 43/00 411/102 |
| 2012/0009009 | A1 * | 1/2012 | Bub | F16B 41/002 403/204 |
| 2012/0246957 | A1 * | 10/2012 | Daniel | G01C 9/24 33/645 |
| 2013/0233992 | A1 | 9/2013 | Darré et al. | |
| 2014/0202525 | A1 * | 7/2014 | Janssens | H02S 20/23 136/251 |
| 2015/0320242 | A1 * | 11/2015 | Potgieter | A47G 1/1626 248/477 |
| 2015/0342375 | A1 * | 12/2015 | Weber | A47G 1/205 29/428 |
| 2016/0123053 | A1 * | 5/2016 | Martin | E06B 3/34 49/398 |
| 2016/0273705 | A1 * | 9/2016 | Ajello | E05C 19/02 |
| 2016/0316942 | A1 | 11/2016 | Greve | |
| 2016/0331158 | A1 * | 11/2016 | Leahy | A47G 1/1613 |
| 2017/0219161 | A1 * | 8/2017 | Dempsey | F16M 13/02 |
| 2019/0013772 | A1 * | 1/2019 | Bamat | F16B 2/12 |
| 2019/0032843 | A1 * | 1/2019 | Burton | F16M 11/2085 |
| 2019/0350387 | A1 * | 11/2019 | Bastian | A47G 1/1626 |

* cited by examiner

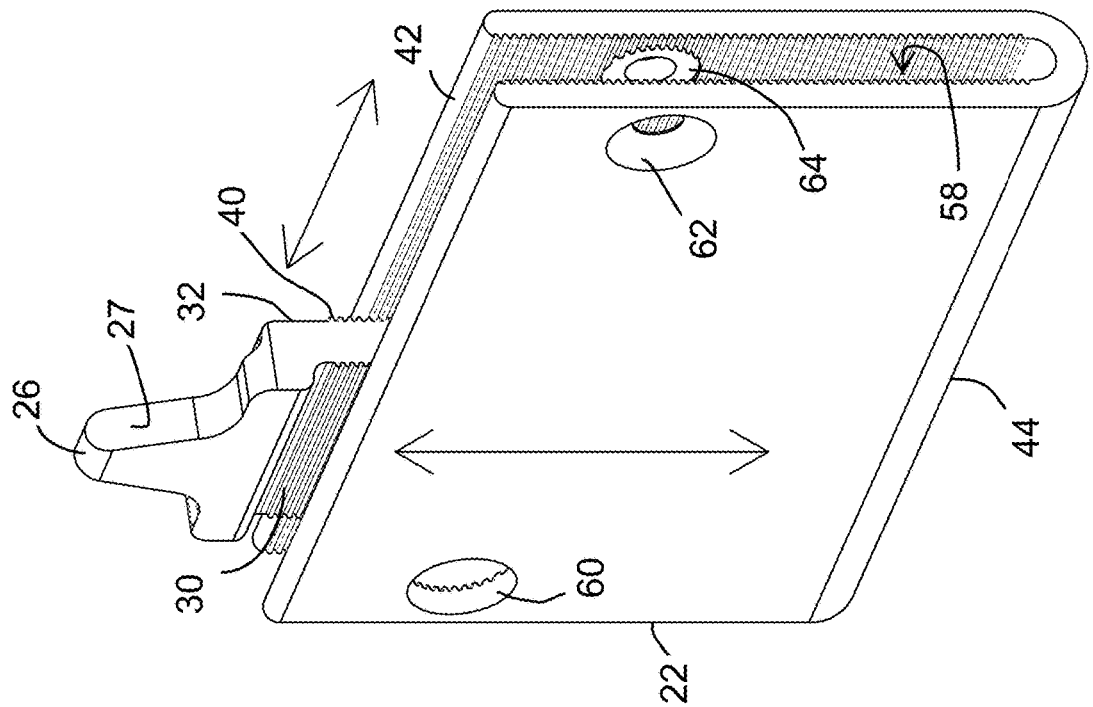
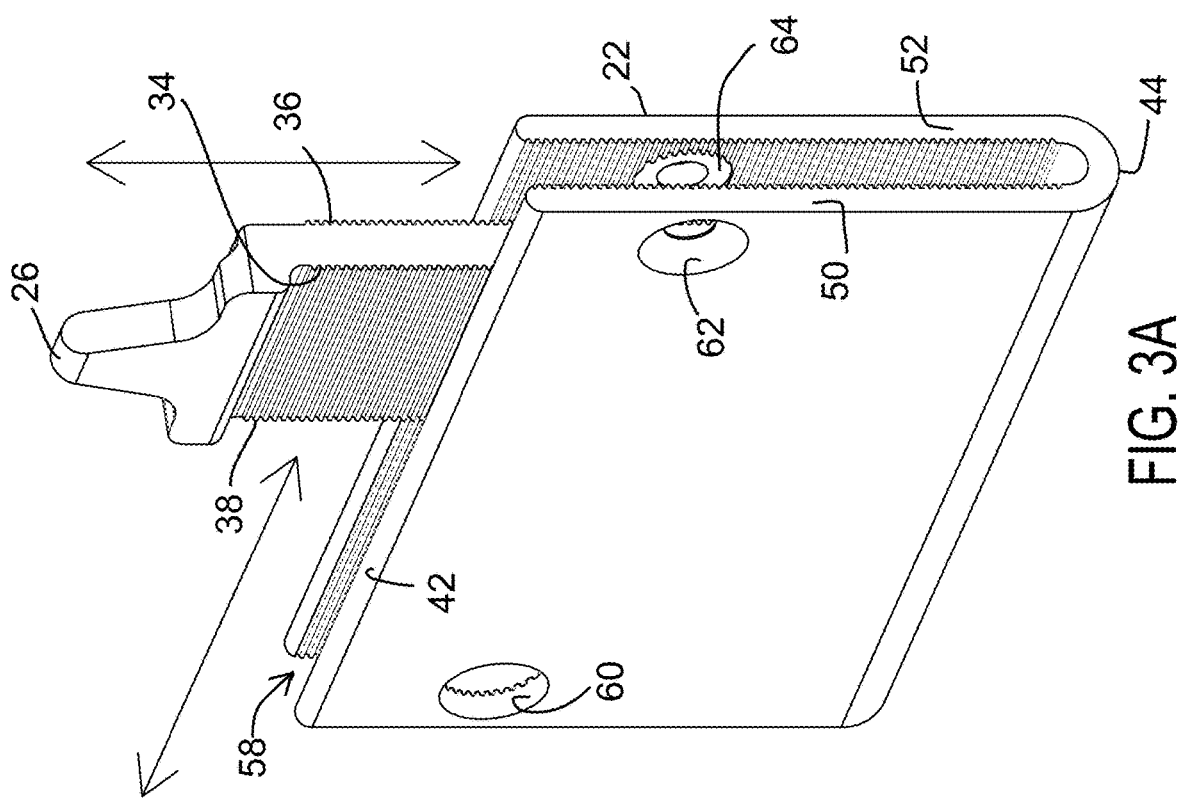

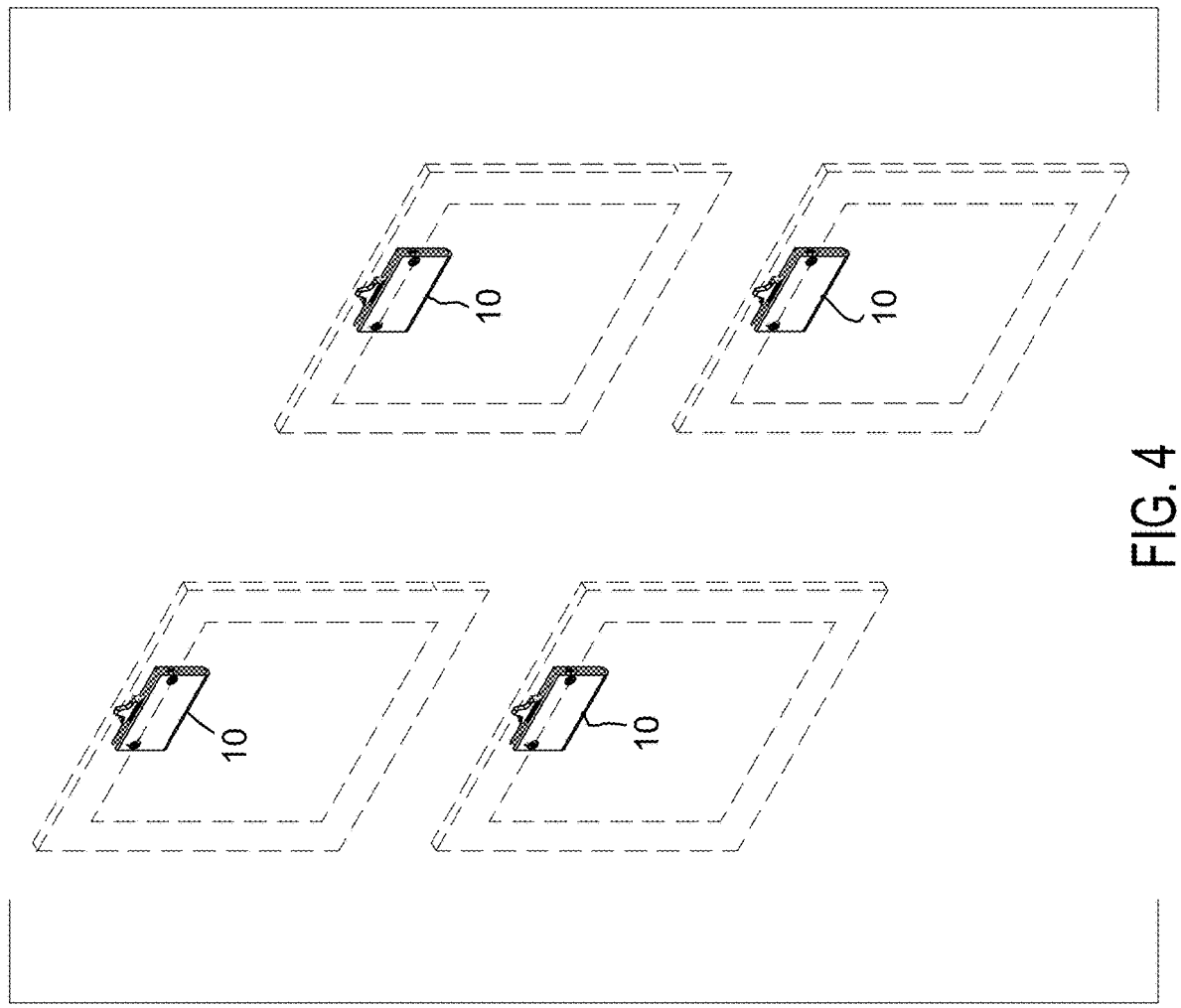

PICTURE HANGER COMPRISING EXTRUDED PROFILE

CROSS-REFERENCE TO RELATED APPLICATION

The present application claims priority to U.S. Provisional Patent Application No. 62/607,365, filed Dec. 19, 2017, which is incorporated herein in its entirety by reference.

FIELD OF THE INVENTION

The present teachings relate to the field of hanger apparatus and methods for placing a frame, such as picture frame, at a selected location on a surface, such as a substantially planar wall. More particularly, the present teachings relate to such hanger apparatus and methods featuring adjustability in one or more axes substantially parallel to such surface, in order to assist with such selected placement.

BACKGROUND OF THE INVENTION

Oftentimes, when it is desired to secure a frame, such as for a picture, at a selected location on a surface, such as a wall, one or more pieces of small-to medium-sized hardware are utilized. In some cases, a common nail can be used, hammered into a wall at a selected location and angled, downwardly, relative thereto such that the distal end of the nail will extend outward and upward once the nail is in place. Slightly more complex than a common nail, various off-the-shelf special-purpose hardware devices are commercially available. Typically, these can comprise something in the nature of a nail or nail-like portion, integral with, or connectable in some manner to, an upward and outwardly extending hook portion. For example, such hardware often can comprise a nail that can pass through a sleeve integral with the hook. The hook can be held against a surface of a wall at a desired height. Conveniently, the hook can be operable to automatically align the nail at an optimum angle. The nail portion, with the accompanying hook portion, can be hammered into a wall, similar to the foregoing nail-only solution. Rather than utilizing the distal end of the nail as a hook, the specific hook portion of the device is used for hanging or attaching the frame at a selected location proximate the surface of the wall. Frames oftentimes include a hanging wire attached to their back sides, which can slip over an installed hook. There are also other known means known that can sit on the nail or hook to support a frame in place. In some instances, for example, one or more holes, channels, keyholes, D-rings, sawtooth hangers, or the like are formed into or on the frame material itself, each of which can fit over or on the distal end of a nail or hook.

Sometimes, with small-to-midsized frames, which usually are not particularly heavy, only a single nail or piece of special-purpose hardware, often referred to as a hanger, is employed. With large to very-large frames, however, which can be heavy and tend to unduly stress just a single nail or special-purpose hanger, plural nails or hangers are often utilized, for example, at spaced-apart locations along the upper margin of the back of the frame, e.g., towards each lateral side of the frame, and sometimes at its central region, as well. Generally, screws can provide more holding power than nails, so they can be preferable for hanging large, heavy pictures. When hanging a frame between studs, a hollow-wall anchor can be used, such as a toggle bolt, molly bolt, or spiral anchor. A spiral anchor is generally considered among the easier of such devices to install, as it can simply be driven into the wall with a screwdriver, and then a screw can be driven into the anchor. Notably, some commercially available spiral anchors include special picture-hanging hooks and some commercially available hangers include an adhesive strip to mount a hook to a wall.

Although not all that complex, several problems are commonly associated with hanging frames in the ways described above. For example, such problems can include one or more of: (i) hanging the frame securely so it doesn't fall; (ii) pinpointing the nail location so the frame hangs with sufficient precision at the desired location; (iii) hanging the frame level with the horizon, with sufficient precision; and (iv) wasting adhesive strips that are placed in the wrong position and need to be removed. Unacceptable errors made with any one or more of the foregoing potential problems can require removal of the problematically placed nail or hanger, and a reattempt. Sometimes multiple rounds are required before satisfactory results are achieved. This can be time-consuming, as well as damaging to the selected surface (s), depending upon the number of repeated attempts required before success is achieved. Further, the task of frame hanging with the above devices and methods can prove to be very frustrating, especially for nonprofessionals, such as homeowners or renters that perform the task only infrequently, for example, as a do-it-yourself (DIY) home-improvement project. Despite the above-mentioned problems, as they have been for countless years, the above-described apparatus and methods of hanging frames continue, to this day, to be the most popular and widely used.

A commercially available product for hanging frames, which is quite different from the above described apparatus and methods, is sold by Designs 4 Life LLC under the registered trademark PICTURE PERFECT HANGER®, marked with U.S. Pat. No. 8,376,308 B2 to Greve', issued Feb. 19, 2013. Such products are available via the internet url: http://pictureperfecthanger.com/.

SUMMARY OF THE INVENTION

The present invention provides an adjustable hanger assembly that includes a slider base and a slider that can be adjusted vertically within the slider base and held in a vertical position by an engagement with the slider base. The slider can engage the slider base and the assembly can be configured to enable the slider to be adjusted horizontally with respect to the sliding base. Accordingly, a hanger assembly is provided that can be adjusted both vertically and horizontally after being fixedly secured to a wall. The slider can include a hanger, for example, at a top end thereof. The hanger can be formed on the slider, and the assembly can be configured, such that the hanger extends above the top of the slider base and above the top of the mounting bracket, such that the assembly can be hidden from view when a frame or most any artwork is hung from the assembly.

The present invention also provides a method that involves mounting a slider base on a wall and then engaging a slider with the slider base, wherein the slider and the slider base as are described herein. The hanger assembly enables adjustment in both vertical and horizontal directions.

These and other objects of the present invention will be more fully understood with reference to the accompanying drawings and the detailed description that follows. The drawings and detailed description are intended to illustrate, not limit, the present invention.

BRIEF DESCRIPTION OF DRAWINGS

The present invention can be even more fully understood with the reference to the accompanying drawings which are intended to illustrate, not limit, the present invention.

FIG. 3A is a top, right-side, perspective view of an adjustable hanger assembly according to various embodiments of the present invention.

FIG. 3B is a top, right-side, perspective view of the same adjustable hanger assembly shown in FIG. 3A but with the slider positioned at a different height and a different horizontal position.

FIG. 4 is a perspective view of a group of four adjustable hanger assemblies, having frames hung therefrom, according to various embodiments of the present invention.

DETAILED DESCRIPTION OF THE INVENTION

Figure 1B:
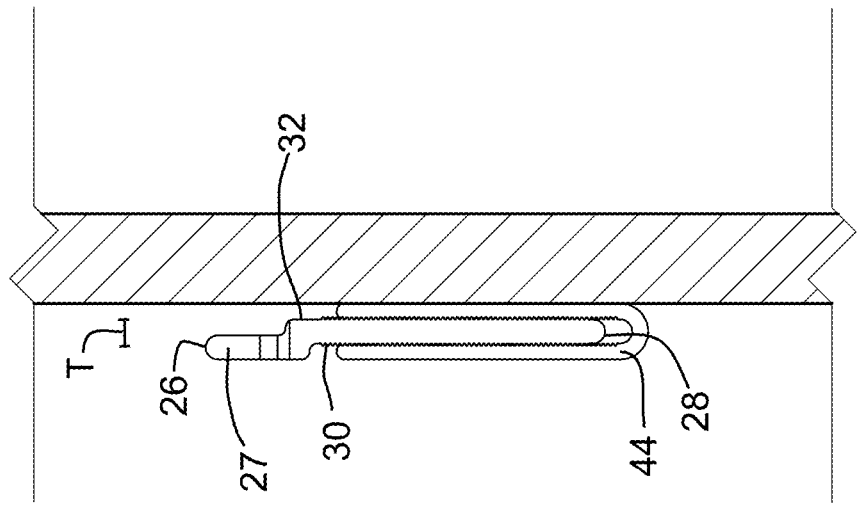
FIG. 1B is a side view of the adjustable hanger assembly of FIG. 1A.

According to various embodiments, the present invention provides an adjustable hanger assembly. The assembly includes a slider and a slider base. The slider comprises a top end, a bottom end, a front wall extending from the top end to the bottom end, and a back wall extending from the top end to the bottom end. The slider base has a top end, a bottom end, and a slot for slidingly engaging the slider. The slider, slider base, or both, can be provided with tabs or locking tabs to prevent the slider from being slid too far to the right or left and out of the slider base.

In operation, the slider is slidingly engaged in the slider base. Alternative configurations are also within the realm of the present invention and include such differences as having a plurality of grooves on only the front or back of the slider and/or on only the front wall or back wall of the slider base. The relative height, when mounted on a wall, of the slider with respect to the slider base, can therefore be adjusted.

According to various embodiments of the present invention, the slider base can have a back wall and the back wall can have an inner surface and an outer surface. The inner surface can partially define the back wall grooves of the slider base. The slider can include a hanger formed on the outer surface and/or top thereof. The hanger can be in the form of a post, a pivotable post, a pin, a knob, a hook, a double hook, combinations thereof, or the like.

The hanger can be in the form of an at least partially round protrusion extending from the slider front wall. The round protrusion can have a shoulder, for example, at a distal end thereof. Between the shoulder and the slider front wall a hanger groove can be defined, for example, between the shoulder of the hanger and the front wall of the slider. In some embodiments, the hanger assembly can further comprise a hook plate. The hook plate can comprise an outer surface, an inner surface, a top end, a bottom end, and a hook mounted or otherwise secured or formed as part of the outer surface. The bottom end of the hook plate can include a clip, for example, to engage a recess in the slider. The inner surface of the hook plate can include a recess for accommodating a hanger, if a hanger exists on the slider. The inner surface of the hook plate can include one or more additional recesses, for example, a recess to accommodate a plurality of gripping ridges formed on the outer surface of the slider. In some embodiments, the slider can be flat on a front surface thereof, such that it does not include a hanger, and the inner surface of the hook plate can therefore be flat and need not include a recess for accommodating a hanger.

The slider can be marked along the front, side, or back, circumferentially, or the like with a line, solid, etching, indicia, or any suitable marking to indicate a maximum recommended or capacity threshold, for example, that should not be exceeded. A maximum height, lowest height, or the like, can be indicated. A preferred maximum height range or value, or a minimum height range or value can be indicated. A scale wherein a maximum suggested weight per height, can be shown, or other information, suggestions, or instructions. Although one or more fasteners can act as a stop to prevent horizontal movement of the slider in at least one direction, indicia can be provided to shown a maximum right or maximum left position of the slider relative to the slider base. In some embodiments, the slider can extend partially out of the slider base, horizontally, and still provide a safe hanger, in which case indicia on the slider alone can be used to indicate a maximum recommended horizontal position.

With reference now to the drawings, FIGS. 1A-4 show an adjustable hanger assembly 10 according to various embodiments of the present invention. Assembly 10 includes a slider 20 and a slider base 22. Each of the components can comprise a metal material, a plastic material, or the like. Slider 20 includes a top end 26, a bottom end 28, a front wall 30 extending from top end 26 to bottom end 28, a back wall 32 extending from top end 26 to bottom end 28, and a plurality of front grooves 34 and back grooves 36. Top end 26 can form or be shaped to provide a hanger 27. The number of front grooves and the number of back grooves can independently be any suitable number, for example, one groove, two grooves, three grooves, four grooves, five grooves, or more. The slider can have ten front grooves or more and/or ten back grooves or more. Front grooves 34 are formed in front wall 30 and are separated from adjacent front grooves 34 by ridges 38. Each ridge 38 terminates in a distal edge. The plurality of front grooves 34 can be arranged adjacent one another such that the distal edges are parallel to one another or otherwise have the same or a similar profile or edge shape.

Back grooves 36 are formed in back wall 32 and separated from adjacent back grooves 36 by ridges 40. Each ridge 40 terminates at a distal edge. The plurality of back grooves 36 can be arranged adjacent one another such that the distal edges of ridges 40 are parallel to one another or otherwise have the same or a similar profile or edge shape. The number of back grooves 36 can be the same as, more than, or less than, the number of front grooves 34. The edges profiles of the front distal edges can be the same as or different from the edge profiles of the back distal edges. The edge profiles can each individually have a cross-sectional shape that is rounded, flat, curved, squared, rectangular, pointed, trapezoidal, triangular, polygonal, semi-circular, or the like.

Figure 1A:
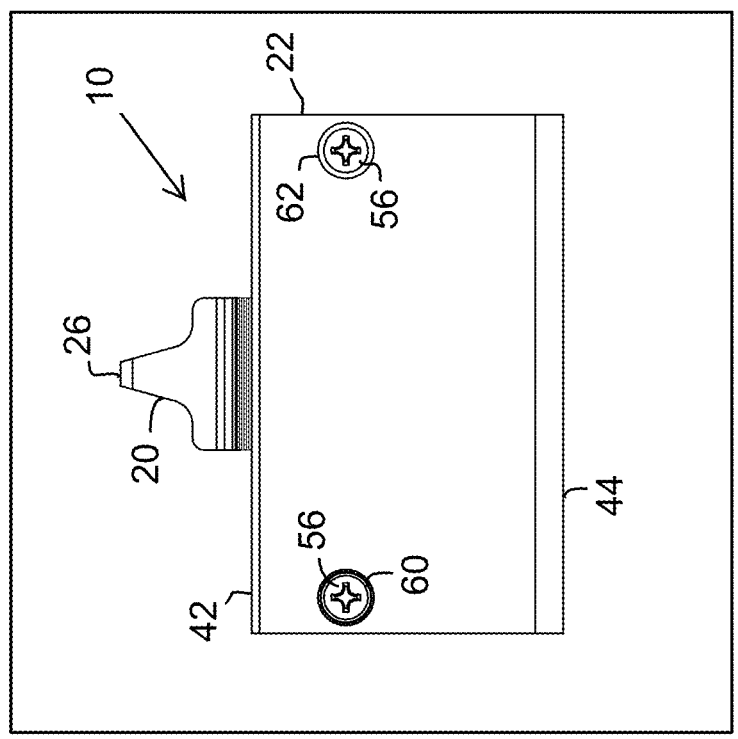
FIG. 1A is a front view of an adjustable hanger assembly according to various embodiments of the present invention, mounted on a wall.
Figure 2B:
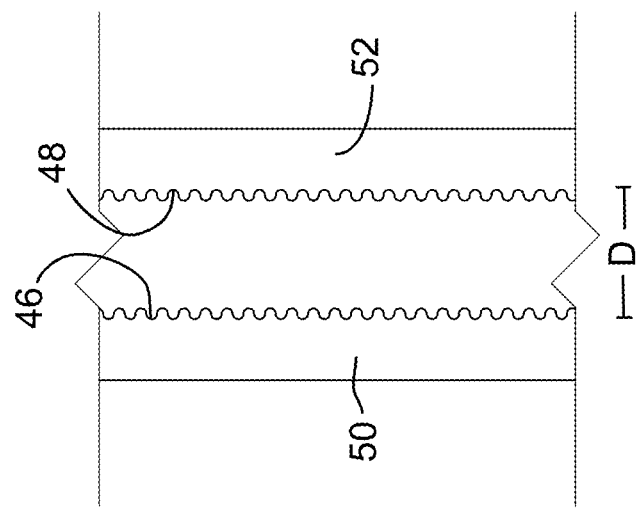
FIG. 2B is a partial side view of a slider base and slot for receiving a slider, according to various embodiments of the present invention.
Figure 2A:
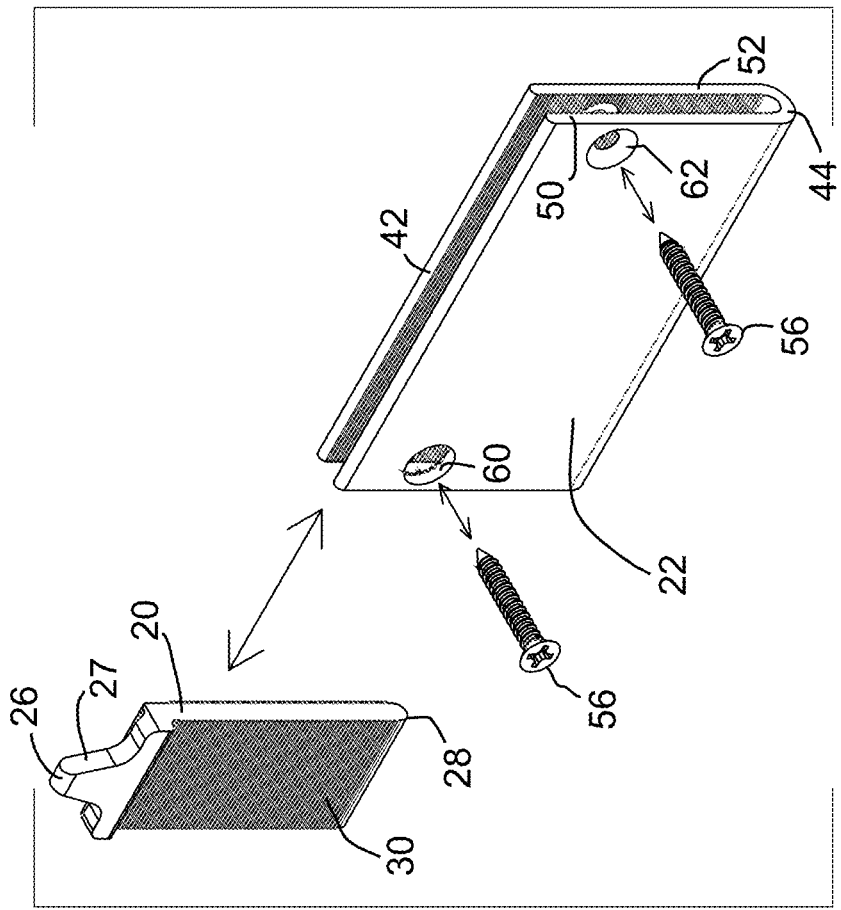
FIG. 2A is a top, right-side, perspective exploded view of an adjustable hanger assembly according to the present invention.
Figure 3E:
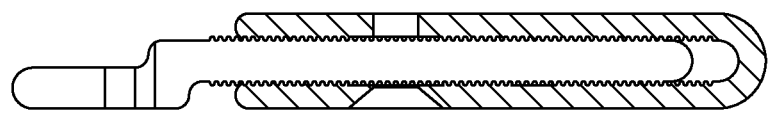
FIG. 3E is a cutaway side view taken through line 3E-3E in FIG. 3C.
Figure 3D:
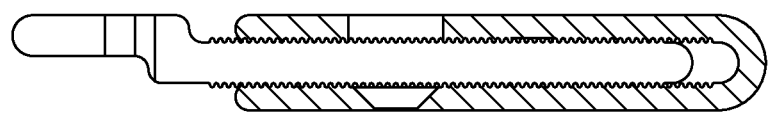
FIG. 3D is a cutaway side view taken through line 3D-3D in FIG. 3C.
Figure 3C:
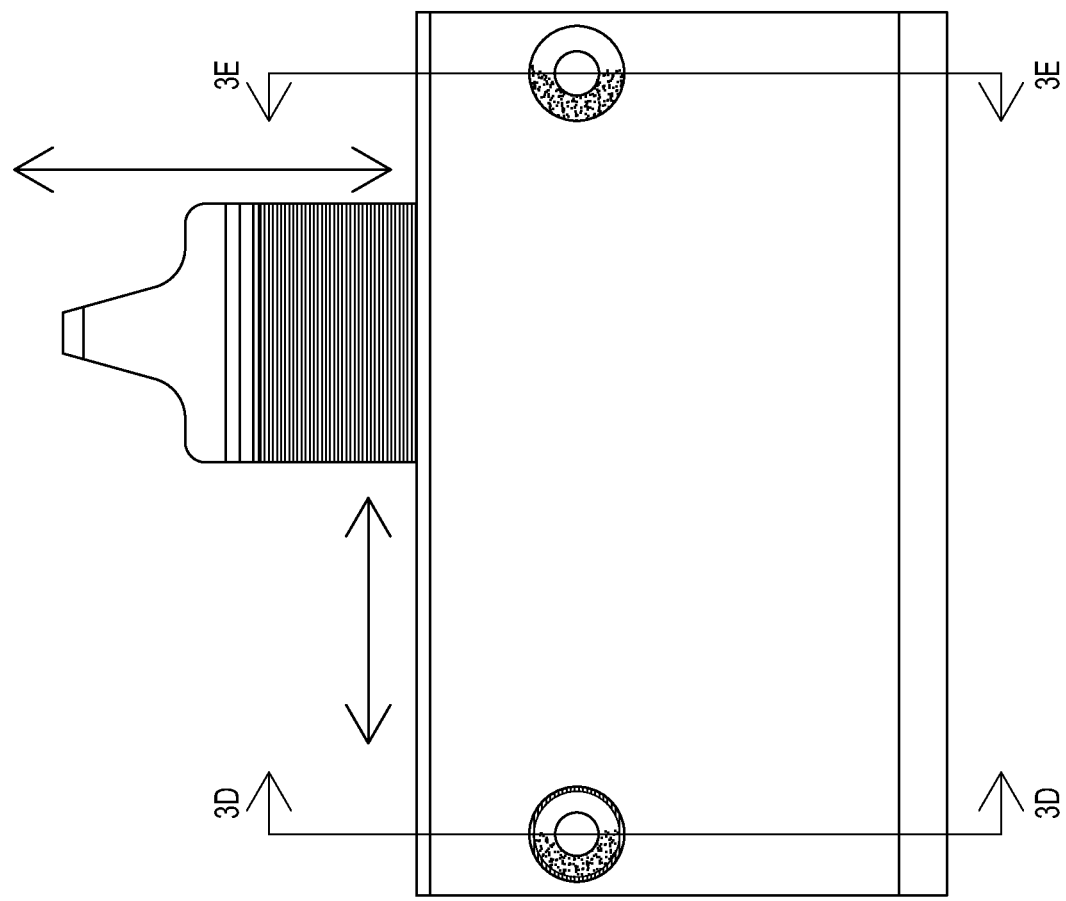
FIG. 3C is a front view of the adjustable hanger assembly shown in FIGS. 3A and 3B.

Slider base 22 can include one or more fasteners 56 for securing slider base 22 to a wall or surface. As shown in FIGS. 1A and 2A, fasteners 56 can be in the form of Philips head screws. Alternatively, the fasteners can comprise other screws, other threaded fasteners, nails, bolts, molly bolts, adhesive pads, a threaded connection, a wall anchor, a combination thereof, and the like. The two fasteners can be the same as or different from each other. Three or more fasteners can be used. A single fastener can be used.

Slider base 22 can have a base top end 42, a base bottom end 44, a plurality of front grooves 46, a plurality of back grooves 48, a base front wall 50 defining front grooves 46, and a base back wall 52 defining back grooves 48. Between base front wall 50 and base back wall 52 a slot 58 is defined. Base front wall 50 and base back wall 52 intersect, and are joined together, at base bottom 44 that can be in the form of a semi-circular wall section such as a U-shaped joiner. Slider base 22 can be formed such that base front wall 50 and base back wall 52 are spaced apart from one another by a distance D (FIG. 2B) that is the same dimension as a thickness T (FIG. 1B) of slider 20. Distance D is measured from the bottom of grooves 46 on the inside surface of base front wall 50 to the bottom of grooves 48 on the inside surface of base back wall 52. Thickness T is measured from the distal edges of slider front wall ridges 38 to the distal edges of slider back wall ridges 40. Accordingly, slot 58 accommodates slider 20 such that ridges 38 on slider front wall 30 can slidingly engage grooves 46 on the inside surface of slider base front wall 50, and ridges 40 on slider back wall 32 can slidingly engage grooves 48 on the inside surface of slider base back wall 52. As such, slider 20 can slide horizontally, and be positioned horizontally, within slot 58 of slider base 22.

Due to the design of the slider and the slider base, each can be formed by extrusion molding material such as a plastic or metal. Extruded lengths of slider or slider base pre-forms can be cut to any desired length. Through-holes can then be drilled and the profile of the top of the slider and/or hanger can be formed by cutting, sanding, molding, or the like.

The different components of assembly 10 can be provided together as a kit, for example, disassembled. Different fasteners can be provided in the kit so that the assembly can be mounted on walls of different materials. In use slider 20 is slidingly engaged in slot 58 of slider base 22. When slider base 22 is mounted to a wall the relative height of the adjustable hanger assembly can be vertically adjusted. Vertical adjustment can be made without the need for tools. The slider can be slid out of the slider base slot and re-inserted at a different height in the slot.

According to various embodiments, at top end 26 of slider 20 a hanger 27 can be provided. Hanger 27 can comprise a hook, a post, a pivotable post, a knob, a combination thereof, and the like. Hanger 27 can be in the form of an at least partially round protrusion extending from the slider front wall and defining a hanger groove.

FIG. 4 illustrates a use for adjustable hanger assembly 10 as a picture hanger and illustrates the use of four adjustable hanger assemblies for hanging four frames, spaced apart, where fine adjustments in both vertical and horizontal directions might be desired.

In some embodiments, a levelling feature can be provided. The levelling feature can comprise, for example, a level comprising an air bubble captured in a graduated liquid vessel. A hanging plumb line can instead be attached to or otherwise provided with, or on, the slider base so that it can be mounted perfectly straight up-and-down.

A dangling plumb line can be provided in the form of a string of beads, such as hollow metal beads. The plumb line can be secured at a top, first bead, to a recess formed in the slider base and can be of such a length as to dangle freely, unobstructed, within the recess. The plumb line can be lined-up with, i.e., aligned with, a level mark that can comprise an etched groove, cut, indicia, or other marking to show where slider base is vertically aligned. Lining up the plumb line with level mark can be done for marking where screw holes should be formed in a wall, to receive mounting screws or fasteners. When aligned with the level mark, the slider base can be considered to be properly positioned horizontally. When the plumb line is not aligned with the level mark, the slider base is crooked, i.e., not horizontal.

Other uses for the device and system of the present invention are also within the realm of the invention. The device can be used to cinch or tighten a line, wire, cable, cord, strap, or rope having one end connected to a fixed piece of hardware and the other end, or a mid-section thereof, connected to, wrapped around, or otherwise supported by the hanger. The device and system can also be used to take slack out of a line, wire, cable, cord, strap, or rope.

The present invention includes the following numbered aspects, embodiments, and features, in any order and/or in any combination:

1. An adjustable hanger assembly comprising a slider and a slider base, the slider comprising a hanger, a top end, a bottom end, a front side, a back side, a plurality of horizontal front grooves formed in the front side, and a plurality of horizontal back grooves formed in the back side, the plurality of horizontal front grooves being arranged adjacent to and parallel to one another and being separated from one another by a plurality of horizontal front ridges, one horizontal front ridge being disposed between each pair of adjacent horizontal front grooves, the plurality of horizontal back grooves being arranged adjacent to and parallel to one another and being separated from one another by a plurality of horizontal back ridges, one horizontal back ridge being disposed between each pair of adjacent horizontal back grooves, and the slider base comprising a front wall having an inner surface, a back wall having an inner surface facing the inner surface of the front wall, and a bottom wall connecting the front wall to the back wall and spacing the inner surface of the front wall from the inner surface of the back wall to define a receiving slot for receiving the slider, the inner surface of the front wall comprising a plurality of horizontal front wall grooves, the inner surface of the back wall comprising a plurality of horizontal back wall grooves, wherein the slider has a thickness extending from the front side to the back side, the slider is configured to slide horizontally into the slot, the horizontal front ridges are complementary to and engage the horizontal front wall grooves through a first engagement, the horizontal back ridges are complementary to and engage the horizontal back wall grooves through a second engagement, and the first and second engagements prevent the slider from moving vertically with respect to the slider base when the slider is inserted into the slot.

2. The adjustable hanger assembly of any preceding or following embodiment/feature/aspect, wherein the hanger is formed at the top end of the slider.

3. The adjustable hanger assembly of any preceding or following embodiment/feature/aspect, wherein the hanger extends from the top end of the slider and protrudes outwardly past the front side when the slider is inserted into the slot.

4. The adjustable hanger assembly of any preceding or following embodiment/feature/aspect, wherein the hanger is in the form of a hook.

5. The adjustable hanger assembly of any preceding or following embodiment/feature/aspect, wherein the hanger is in the form of an at least partially round protrusion extending from the slider front side and defining a hanger groove.

6. The adjustable hanger assembly of any preceding or following embodiment/feature/aspect, wherein the slider base has a top edge, the slider is engaged in the slider base, the adjustable hanger assembly is mounted on a wall, and the top end of the slider is above the top edge of the slider base.

7. The adjustable hanger assembly of any preceding or following embodiment/feature/aspect, wherein the slider base has a top that is opposite the bottom wall, and the slot narrows from the bottom wall to the top of the slider base such that, when the slider is inserted into the slot, the front wall and the back wall of the slider base are spring-biased and urged toward one another.

8. The adjustable hanger assembly of any preceding or following embodiment/feature/aspect, wherein the slider is in the slot and engaged with the slider base.

9. The adjustable hanger assembly of any preceding or following embodiment/feature/aspect, wherein the slider is in the slot and engaged with the slider base.

10. The adjustable hanger assembly of any preceding or following embodiment/feature/aspect, wherein the slider and the slider base comprise plastic material.

11. The adjustable hanger assembly of any preceding or following embodiment/feature/aspect, further comprising a threaded fastener having a head, the head having an outer diameter, wherein the front wall has a first through-hole formed therein, the first through-hole having an inner diameter that is larger than the outer diameter, and the back wall has a tapered through-hole formed therein, the tapered through-hole being aligned with the first through-hole and having an inner diameter that is smaller than the outer diameter.

12. The adjustable hanger assembly of any preceding or following embodiment/feature/aspect, further comprising a second threaded fastener having a second head, the second head having a second outer diameter, wherein the front wall has a second through-hole formed therein having a second inner diameter, the back wall has a third through-hole formed therein aligned with the second through-hole, and the second inner diameter is smaller than the second outer diameter.

13. A method comprising:
mounting the adjustable hanger assembly of any preceding or following embodiment/feature/aspect, on a wall by screwing the threaded fastener through the tapered through-hole and into the wall such that the head passes through the first through-hole and is seated in the tapered through-hole;
screwing the second fastener through the second and third through-holes and into the wall; and
inserting the slider, horizontally, into the slot.

14. The method of any preceding or following embodiment/feature/aspect, further comprising tightening the second fastener after inserting the slider into the slot.

15. The method of any preceding or following embodiment/feature/aspect, further comprising removing the slider from the slot and re-inserting the slider at a higher or lower location in the slot, to adjust the height of the hanger.

16. A method comprising:
extruding a plastic or metal material to form a pre-form of a slider and a pre-form of a slider base; and
working the pre-form of the slider and the pre-form of the slider base to form the slider and slider base of the hanger assembly of any preceding or following embodiment/feature/aspect.

17. The method of any preceding or following embodiment/feature/aspect, further comprising:
mounting the slider base to a wall; and
engaging the slider with the slider base.

18. The method of any preceding or following embodiment/feature/aspect, wherein the working comprises cutting the slider pre-form into the slider and cutting and drilling the slider base pre-form into the slider base.

19. The method of any preceding or following embodiment/feature/aspect, wherein the material comprises a plastic material.

20. The method of any preceding or following embodiment/feature/aspect, wherein the material comprises a metal material.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An adjustable hanger assembly comprising a slider a slider base, a first threaded fastener, and a second threaded fastener,
the slider comprising a hanger, a top end, a bottom end, a front side, a back side, a plurality of horizontal front grooves formed in the front side, and a plurality of horizontal back grooves formed in the back side, the plurality of horizontal front grooves being arranged adjacent to and parallel to one another and being separated from one another by a plurality of horizontal front ridges, one horizontal front ridge being disposed between each pair of adjacent horizontal front grooves, the plurality of horizontal back grooves being arranged adjacent to and parallel to one another and being separated from one another by a plurality of horizontal back ridges, one horizontal back ridge being disposed between each pair of adjacent horizontal back grooves,
the slider base comprising a front wall having an inner surface, a back wall having an inner surface facing the inner surface of the front wall, and a bottom wall connecting the front wall to the back wall and spacing the inner surface of the front wall from the inner surface of the back wall to define a receiving slot for receiving the slider, the inner surface of the front wall comprising a plurality of horizontal front wall grooves, the inner surface of the back wall comprising a plurality of horizontal back wall grooves, wherein the slider has a thickness extending from the front side to the back side, the slider is configured to slide horizontally into the slot, the horizontal front ridges are complementary to and engage the horizontal front wall grooves through a first engagement, the horizontal back ridges are complementary to and engage the horizontal back wall grooves through a second engagement, and the first and second engagements prevent the slider from moving vertically with respect to the slider base when the slider is inserted into the slot, the first threaded fastener having a first head, the first head having a first outer diameter, wherein the front wall has a first through-hole formed therein, the first through-hole having a first inner diameter that is larger than the first outer diameter, and the back wall has a second through-hole formed therein, the second through-hole being aligned with the first through-hole and having a second inner diameter that is smaller than the first outer diameter, and the second threaded fastener having a second head, the second head having a second outer diameter, wherein the front wall has a third through-hole formed therein having a third inner diameter, the back wall has a fourth through-hole formed therein aligned with the third through-hole, and the third inner diameter is smaller than the second outer diameter.

2. The adjustable hanger assembly of claim 1, wherein the hanger is formed at the top end of the slider.

3. The adjustable hanger assembly of claim 1, wherein the hanger extends from the top end of the slider and protrudes outwardly past the front side when the slider is inserted into the slot.

4. The adjustable hanger assembly of claim 1, wherein the hanger is in the form of a hook.

5. The adjustable hanger assembly of claim 1, wherein the hanger is in the form of an at least partially round protrusion extending from the slider front side and defining a hanger groove.

6. The adjustable hanger assembly of claim 1, wherein the slider base has a top edge, the slider is engaged in the slider base, the adjustable hanger assembly is mounted on a wall, and the top end of the slider is above the top edge of the slider base.

7. The adjustable hanger assembly of claim 1, wherein the slider base has a top that is opposite the bottom wall, and the slot narrows from the bottom wall to the top of the slider base such that, when the slider is inserted into the slot, the front wall and the back wall of the slider base are spring-biased and urged toward one another.

8. The adjustable hanger assembly of claim 7, wherein the slider is in the slot and engaged with the slider base.

9. The adjustable hanger assembly of claim 1, wherein the slider is in the slot and engaged with the slider base.

10. The adjustable hanger assembly of claim 1, wherein the slider and the slider base comprise plastic material.

11. The adjustable hanger assembly of claim 1, wherein the second through-hole is a tapered through-hole and the third through-hole is a tapered through-hole.

12. A method comprising:
mounting the adjustable hanger assembly of claim 11 on a wall by screwing the first threaded fastener through the tapered second through-hole and into the wall such that the head passes through the first through-hole and is seated in the tapered second through-hole;
screwing the second fastener through the third and fourth through-holes and into the wall; and
inserting the slider, horizontally, into the slot.

13. The method of claim 12, further comprising tightening the second threaded fastener after inserting the slider into the slot.

14. The method of claim 12, further comprising removing the slider from the slot and re-inserting the slider at a higher or lower location in the slot, to adjust the height of the hanger.

15. An adjustable hanger assembly comprising a slider, a slider base, a first threaded fastener, and a second threaded fastener, the slider comprising a hanger, a top end, a bottom end, a front side, a back side, a plurality of horizontal front grooves formed in the front side, and a plurality of horizontal back grooves formed in the back side, the plurality of horizontal front grooves being arranged adjacent to and parallel to one another and being separated from one another by a plurality of horizontal front ridges, one horizontal front ridge being disposed between each pair of adjacent horizontal front grooves, the plurality of horizontal back grooves being arranged adjacent to and parallel to one another and being separated from one another by a plurality of horizontal back ridges, one horizontal back ridge being disposed between each pair of adjacent horizontal back grooves, and the slider base comprising a front wall having an inner surface, a back wall having an inner surface facing the inner surface of the front wall, and a bottom wall connecting the front wall to the back wall and spacing the inner surface of the front wall from the inner surface of the back wall to define a receiving slot for receiving the slider, the inner surface of the front wall comprising a plurality of horizontal front wall grooves, the inner surface of the back wall comprising a plurality of horizontal back wall grooves, wherein the slider has a thickness extending from the front side to the back side, the slider is configured to slide horizontally into the slot, the horizontal front ridges are complementary to and engage the horizontal front wall grooves through a first engagement, the horizontal back ridges are complementary to and engage the horizontal back wall grooves through a second engagement, and the first and second engagements prevent the slider from moving vertically with respect to the slider base when the slider is inserted into the slot, the first threaded fastener having a first head, the first head having an outer diameter, wherein the front wall has a first through-hole formed therein, the first through-hole having an inner diameter that is larger than the outer diameter, and the back wall has a tapered through-hole formed therein, the tapered through-hole being aligned with the first through-hole and having an inner diameter that is smaller than the outer diameter, and the second threaded fastener having a second head, the second head having a second outer diameter, wherein the front wall has a second through-hole formed therein having a second inner diameter, the back wall has a third through-hole formed therein aligned with the second through-hole, and the second inner diameter is smaller than the second outer diameter.

* * * * *